United States Patent
Bellis, Jr. et al.

(10) Patent No.: US 7,044,370 B2
(45) Date of Patent: May 16, 2006

(54) CHECKOUT SYSTEM WITH A FLEXIBLE SECURITY VERIFICATION SYSTEM

(75) Inventors: Donald C Bellis, Jr., Canandaigua, NY (US); Barry H Keys, Batavia, NY (US); Paul F Denimarck, Webster, NY (US)

(73) Assignee: ECR Software Corporation, Boone, NC (US)

( * ) Notice: Subject to any disclaimer, the term of this patent is extended or adjusted under 35 U.S.C. 154(b) by 245 days.

(21) Appl. No.: 10/188,290

(22) Filed: Jul. 1, 2002

(65) Prior Publication Data

US 2003/0024982 A1    Feb. 6, 2003

Related U.S. Application Data

(60) Provisional application No. 60/302,485, filed on Jul. 2, 2001.

(51) Int. Cl.
*G06K 15/00* (2006.01)
(52) U.S. Cl. .................................... 235/383
(58) Field of Classification Search ........... 235/383, 235/325, 462.15, 381, 385; 186/59–61
See application file for complete search history.

(56) References Cited

U.S. PATENT DOCUMENTS

| | | | |
|---|---|---|---|
| 3,681,570 A | 8/1972 | Abt | |
| 3,681,571 A | 8/1972 | Strohschneider | |
| 4,792,018 A | 12/1988 | Humble et al. | 186/61 |
| 4,861,972 A | 8/1989 | Elliott et al. | |
| 5,220,970 A | 6/1993 | Bachmann | |
| 5,267,314 A | 11/1993 | Stambler | 380/24 |
| 5,340,970 A * | 8/1994 | Wolfe et al. | 235/383 |
| 5,497,314 A * | 3/1996 | Novak | 705/17 |
| 5,524,073 A | 6/1996 | Stambler | 380/24 |
| 5,641,039 A | 6/1997 | Dumont | 186/61 |
| 5,646,998 A | 7/1997 | Stambler | 380/25 |
| 5,664,110 A | 9/1997 | Green et al. | 705/26 |
| 5,715,181 A | 2/1998 | Horst | |
| 5,747,784 A | 5/1998 | Walter et al. | 235/383 |
| 5,793,302 A | 8/1998 | Stambler | 340/825.34 |
| 5,877,485 A | 3/1999 | Swartz | 235/383 |
| 5,900,614 A | 5/1999 | Nakakawaji et al. | 235/462.14 |
| 5,923,735 A | 7/1999 | Swartz et al. | 379/93.12 |
| 5,936,541 A | 8/1999 | Stambler | 340/825.33 |
| 5,965,861 A | 10/1999 | Addy et al. | 235/383 |
| 5,967,264 A | 10/1999 | Lutz et al. | 186/61 |
| 5,974,148 A | 10/1999 | Stambler | 380/25 |
| 5,979,757 A | 11/1999 | Tracy et al. | 235/383 |
| 6,032,128 A | 2/2000 | Morrison et al. | 705/23 |
| 6,069,696 A * | 5/2000 | McQueen et al. | 356/326 |
| 6,075,594 A * | 6/2000 | Thomas et al. | 356/328 |
| 6,080,938 A | 6/2000 | Lutz | |
| 6,213,395 B1* | 4/2001 | Dejaeger et al. | 235/383 |
| 6,215,078 B1* | 4/2001 | Torres et al. | 177/25.15 |

(Continued)

*Primary Examiner*—Ahshik Kim
(74) *Attorney, Agent, or Firm*—MacCord Mason PLLC

(57) ABSTRACT

A method and system for self-checkout of items from a retail or non-retail establishment is disclosed. The system verifies security by comparing a measured physical characteristic of an item with the stored security characteristic for that item and determining if the measured physical characteristic is within an operator-modifiable tolerance range. The operator-modifiable tolerance range is different for different of items in the store. Moreover, a stored security characteristic of an item can be updated automatically. In addition, the system includes a dynamic-weight scale that reports a measured weight before the scale settles.

11 Claims, 5 Drawing Sheets

U.S. PATENT DOCUMENTS 6,424,745 B1 * 7/2002 Hansen et al. ............... 382/191
6,431,446 B1 * 8/2002 Gu et al. .................... 235/454
6,457,644 B1 * 10/2002 Collins et al. ......... 235/462.14
6,598,791 B1 * 7/2003 Bellis, Jr. et al. ........... 235/383

* cited by examiner

CHECKOUT SYSTEM WITH A FLEXIBLE SECURITY VERIFICATION SYSTEM

This application claims priority to provisional application Ser. No. 60/302,485, filed Jul. 2, 2001, which is hereby incorporated by reference.

BACKGROUND OF THE INVENTION

The field of the present invention relates to checkout counters.

Checkout counters are ubiquitous in the retail environment. In a typical retail operation, a shopper gathers the items that she wants to buy and presents them at a checkout counter, a clerk then scans the items' bar codes and the point-of-sale (POS) system totals the shopper's bill. The clerk may also apply any promotional discounts to the bill such as by scanning discount coupons, and the shopper then tenders payment. In addition, at some stores, a bagger or the clerk may bag the items for the shopper.

In order to reduce operating expenses, some businesses have implemented self-checkout counters substituting for the clerk and the bagger. One concern with self-checkout systems, however, is security, i.e., to insure that all items are paid for and to verify that the item being taken out of the store is the same item that has been scanned and paid for. For example, some self-checkout counters have utilized an item's weight or height information to verify that the item being taken out of the store is the same item that the shopper has paid for. Specifically, the system database includes stored security characteristics such as weight or height associated with each item, and the checkout system measures the actual weight or height of the item during checkout. If the item's measured security characteristic matches with the item's security characteristic, the self-checkout system will allow the purchase of the item. Otherwise, the checkout system will disapprove the transaction.

Some systems, as disclosed in U.S. Pat. Nos. 3,681,570 and 3,681,571, provide a tolerance range for comparing the measured and the security weight. If the measured weight agrees within the tolerance range, the system approves the item. Other systems, as disclosed in U.S. Pat. No. 5,340,970, provide for a manual override wherein if the system disapproves an item, an operator such as a store attendant or manager can manually verify the item and allow the system to accept a new security characteristic corresponding to the then measured characteristic. The manual-override functionality helps account for weight changes, for example, due to free promotional items sometimes being packaged together with the purchased items.

Despite these functionalities, the current self-checkout system may still require a high degree of store employee or operator intervention. Because a machine lacks the judgment of a human being, these systems tend to be very rigid and inflexible. Hence a need exists for a system that provides more efficient throughput and retains adequate security.

SUMMARY OF THE INVENTION

The present invention is directed toward a method and system for self-checkout of items from a retail or non-retail establishment. In one aspect, the method verifies security by comparing the physical characteristic of the item to be checked out with a stored security characteristic of the item. If the item's physical characteristic is within an operator-modifiable tolerance range for which the item is associated, the item is accepted. In another aspect, the stored security characteristic of the item is also automatically updated. In yet another aspect, the method and system utilize a dynamic-weight scale that reports the weight of the item to be compared with the stored security weight before the weight scale settles.

DESCRIPTION OF THE PREFERRED EMBODIMENTS

The preferred embodiments will now be described with reference to the drawings. In its preferred application, a self-checkout system is generally described in the context of a grocery store. The system is not, however, applicable only to grocery stores but can be applied to convenience stores, drug stores, book and novelty stores, mass merchants, warehouse stores or other retail establishments. The system may also be applied to non-retail establishments such as public libraries.

Figure 1:
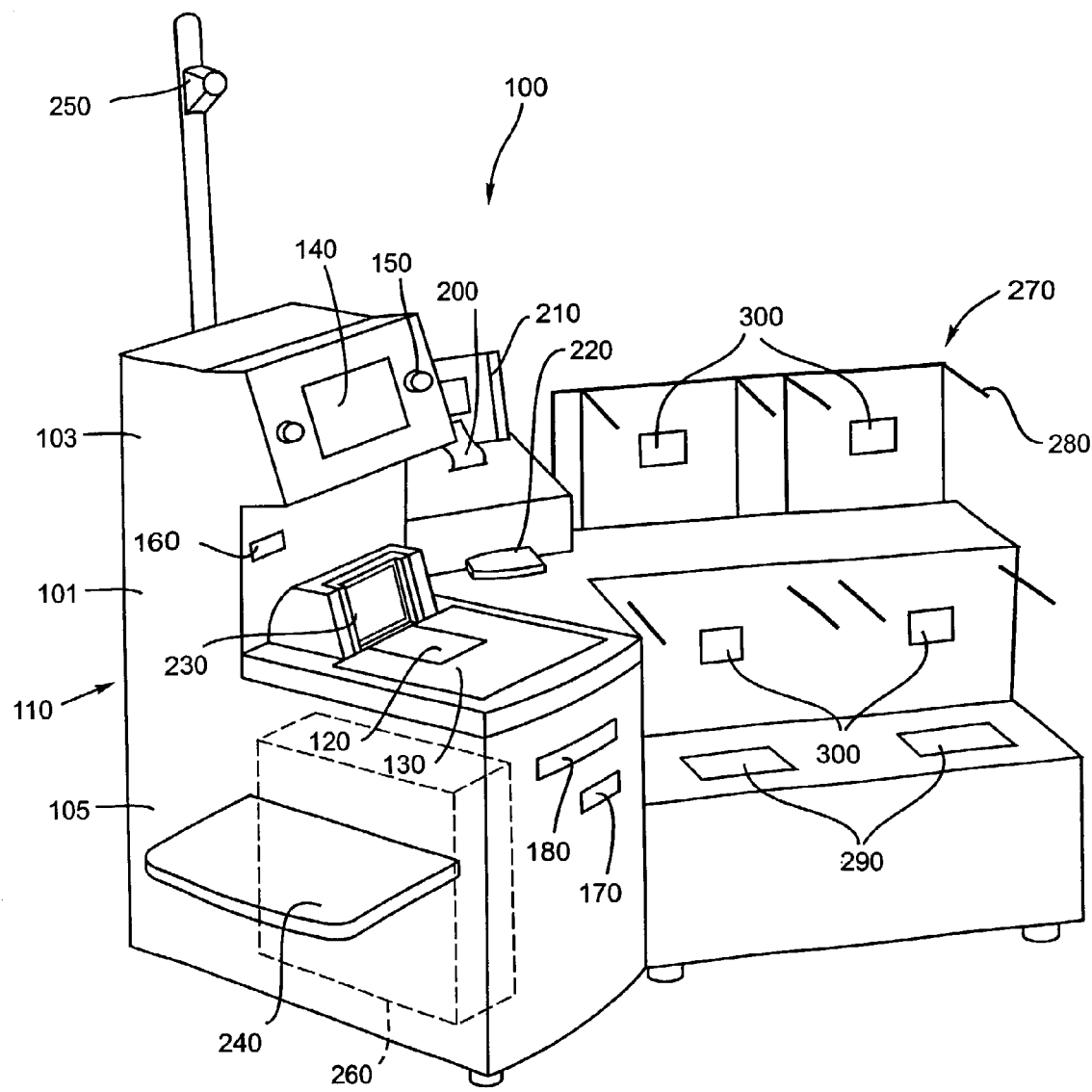
FIG. 1 is a perspective view of an embodiment of a self-checkout system.

FIG. 1 generally depicts the physical components of a self-checkout system 100 comprising a scanning and payment station 110. The scanning and payment station 110 generally includes a system housing 101 having an upper portion 103 and a lower portion 105 integrally connected with each other. The upper portion 103 of the system housing 101 may include a user-interface such as a touch-screen LCD or CRT display 140, a speaker 150, a video display with keyboard, mouse, light-pen, or other input devices, or any other suitable visual, tactile (Braille system), or audible user-interface. The user-interface may be used to provide instructions, items' prices, information, or data to the customer. Customers may also provide instructions, select system options, or input information such as item description, item code, or any other data through the user-interface. Preferably, the user-interface uses a touch-screen LCD or CRT display 140 and a speaker 150, which are integrated with the upper portion 103 of the system housing 101 and may be positioned at a height level comfortable for use with the general population (e.g. three to five feet).

Above the touch-screen LCD or CRT display 140 may include a surveillance camera 250 such as a CCD camera that may be used to capture a single image of or to continuously view each of the items being purchased or other self-checkout activity. Below the touch-screen LCD or CRT display 140, a bill acceptor 160 may also be integrally connected with the upper portion 103 of the system housing 101. The bill acceptor 160 recognizes and accepts cash currency much like any other bill acceptor currently in use with vending machines or change dispensing machines.

Integrally connected to the upper portion 103 of the system housing 101 is the lower portion 105, which generally includes a horizontal platform 107 at a height level comfortable for use with the general population (e.g. three feet high). A part of the horizontal platform 107 is preferably formed by a weight scale 130 integrally connected with an identification-code reader 120. The integrated weight-scale/identification-code reader is described in U.S. Pat. No. 5,410,108, which is hereby incorporated by reference in its entirety as if set forth fully herein. Alternatively, the identification-code reader may be independent from the weight scale. Examples of the identification-code reader include an optical-code reader, a bar-code laser scanner, a radio frequency identification tag reader, a CCD bar code scanner or any other type of machine code reader, which can decode encoded indicia or tag on an item. The identification-code reader may also be a multi-window fixed bar scanner or a hand-held scanner or other type of fixed or portable reader, or a hybrid reader such as the Duet™ scanner also available from PSC Inc. In use, the identification-code reader 120 identifies an item in the store by decoding an item code associated with the item. An item code signal is then communicated to the computer 260 of the system 100 through an item-code signal generator (not shown). As used herein and below, signal generators are conventional input/output devices that are used to exchange data, software, or other electronic, optical, electromagnetic, radio wave or other signals between a device and a computer or between components of a computer.

Below the identification-code reader 120 and on a front side of the lower portion 105 of the system housing 101 may include a bill dispenser 180 and a coin dispenser 170 for dispensing change in the form of cash or coin currencies. Also, on an adjacent side of the lower portion 105, as shown in FIG. 1, may include a folding shelf 240 pivotally coupled to the system housing 101 for temporarily holding items to be purchased. Adjacent to the identification-code reader 120, opposite to the folding shelf 240, and at the same level as the horizontal platform 170 may sit a conventional receipt printer 200 for printing receipts, a conventional Electronic-Funds-Transfer ("EFT")/magnetic-strip card reader 210 for use with a credit card, cash or debit card, or electronic benefits transfer, and a conventional check reader/writer (MICR) 220 for verifying a check with a banking network. The receipt printer 200 and the check reader/writer may also be integrated into a single unit.

Furthermore, within the lower portion of the system housing 101 may be positioned a security-verification system having a checkout terminal or a computer 260. Although the lower portion 105 of the system housing 101 may be a convenient location to position a computer 260 that communicates and controls all of the devices associated with the system 100, the computer 260 may also be located remotely away from the self-checkout system 100. Examples of a computer 260 or a remote computer system include a workstation manufactured by Sun Microsystems®, a main frame computer, a personal computer such as the type manufactured by IBM® or Apple®, a server running a server utility such as Microsoft Windows NT® or Linux, or any other suitable devices having a processor that execute a program. The program may be a software, a firmware, or a program embedded in an application specific hardware. The program recorded on a medium or a logic circuit is preferably used to execute the functions of the system 100 as will be described in more detail below. Various components of the computer system will be described in more detail below with reference to FIG. 3. Although the scanning and payment station 110 is described as an integrated unit, it is also contemplated that the scanning and payment function may be two separate units located next to each other or at a distance from each other (e.g. the payment station may be located at an attendant station.)

Adjacent to the scanning and payment station 110, as shown in FIG. 1, may be positioned a bagging station 270 that may include one or more electronic scales 290. An example of an electronic scale with its components is fully described in U.S. Pat. No. 5,410,108, which has been incorporated by reference in its entirety above. The electronic scales 290 preferably form the base of the bagging station 270 such that checked-out items may be bagged and verified by weight at the same time. As such, the electronic scales 290 will be referred hereinafter as security-bagging scales 290. The security-bagging scales 290 having a weight signal generator (not shown) measure the actual weight (hereinafter "measured weight") of an item or items purchased and report the measured weight to the computer 260 through the weight signal generator. The computer 260 then compares the measured weight with a weight value of the item or items stored (hereinafter "security weight") in the computer memory or in a remote or semi-remote database such as a computer server or external storage medium. The bagging station 270 may further include one or more electronic article-surveillance monitors 300 and deactivators in communication with the computer 260 for verifying that all the items have been scanned into the self-checkout system 100 and deactivating the magnetic security tag on the item. Alternatively, the electronic article surveillance deactivator may also be incorporated within the identification-code reader 120. The bagging station 270 may also include bag-support arms 280 for holding shopping bags in an open position.

Figure 2:
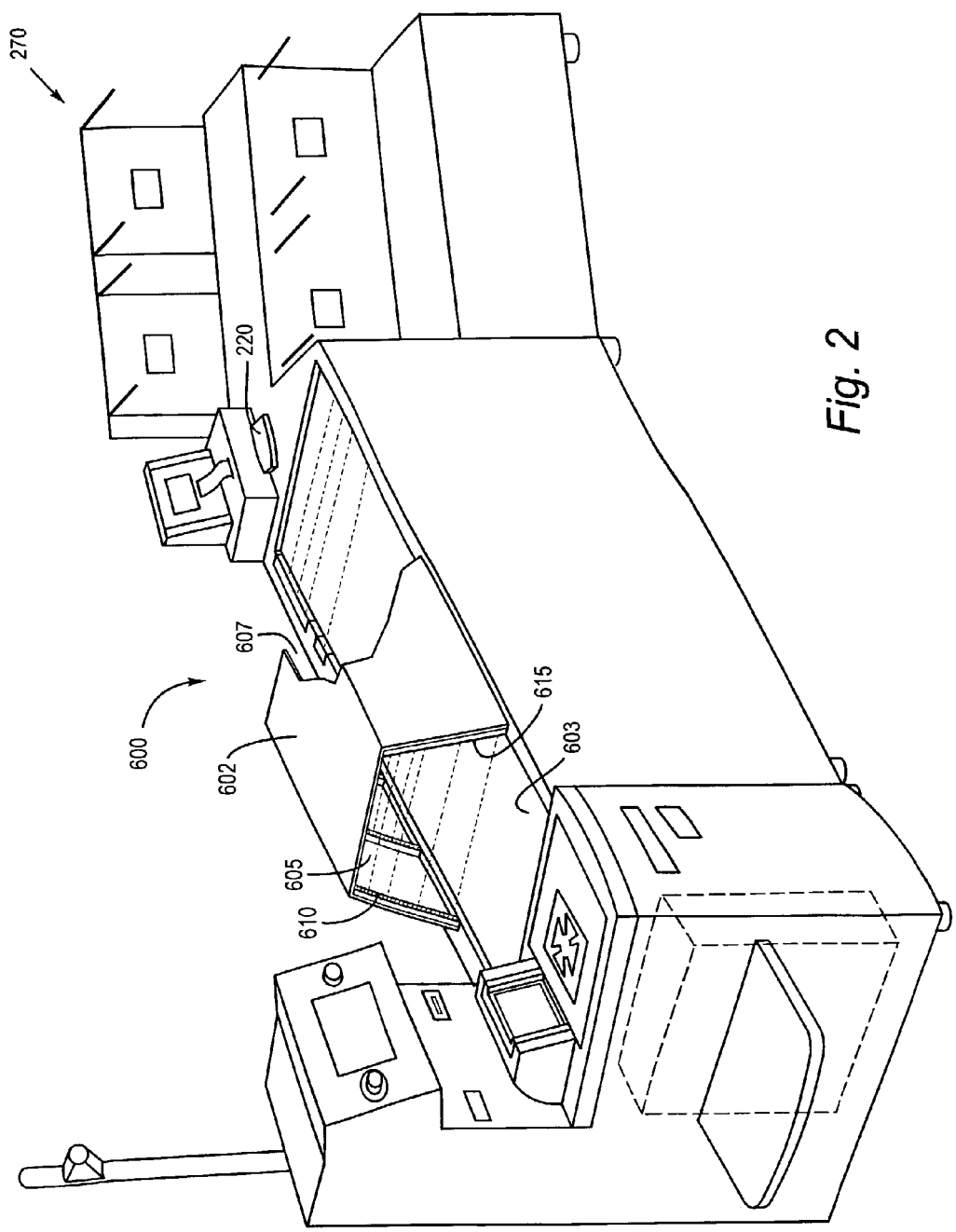
FIG. 2 is a perspective view of another embodiment of a self-checkout system.

In addition to having weighing scales 130, 290, the system 100 may also include an item-shape sensor 600 as shown in FIG. 2. The item-shape sensor 600 may be positioned between the scanning/payment station 110 and the bagging station 270. The item-shape sensor 600 generally comprises a tunnel 602 with a conveyor belt 603 moving at the base of the tunnel 602. Vertically aligned arrays of light emitting diodes (LEDs) 610 or other light source may be positioned on one side of the tunnel entry 605, or the tunnel exit 607, or both. Opposite to the arrays of LEDs 610, on the other side of the tunnel entry 605, or tunnel exit 607, or both, may be positioned corresponding arrays of photocells or light detectors 615 that are also vertically aligned. This arrangement creates at the tunnel entry 605 or tunnel exit 607, or both, electronic curtains formed with light emitting from the LEDs 610 and received by the detectors 615. As an item moves into the tunnel 602, the item passes through the electronic curtain and blocks a number of LED lights 610 from being detected by a corresponding number of light detectors 615. The item's height may be determined by the number of LED lights 610 that it blocks. For example, the vertically aligned array of LEDs 610 may include thirty LEDs each being 10 centimeters apart, and forming a light strip that is 300 centimeters high. An item with a height of 150 centimeters will correspondingly block fifteen of the LEDs. The number of blocked or unblocked LEDs may then be communicated to the computer 260 through a signal generator(s) (not shown). Based on the known distance of 10 centimeters between each LED lights and the number of blocked LEDs, the computer 260 may be able to calculate the height of the item as 150 centimeters.

Similarly, the item's width or length may be determined by using a second array of LED lights (not shown) horizontally aligned and a corresponding horizontally aligned array of light detectors (not shown) at the base of the tunnel 602. The computer may then compare the measured height, width, or length of the item with the security height, width, or length for that item stored in the computer memory. U.S. Pat. No. 4,792,018, which describes a similar item-shape sensor is hereby incorporated by reference in its entirety as if fully set forth herein.

Figure 3:
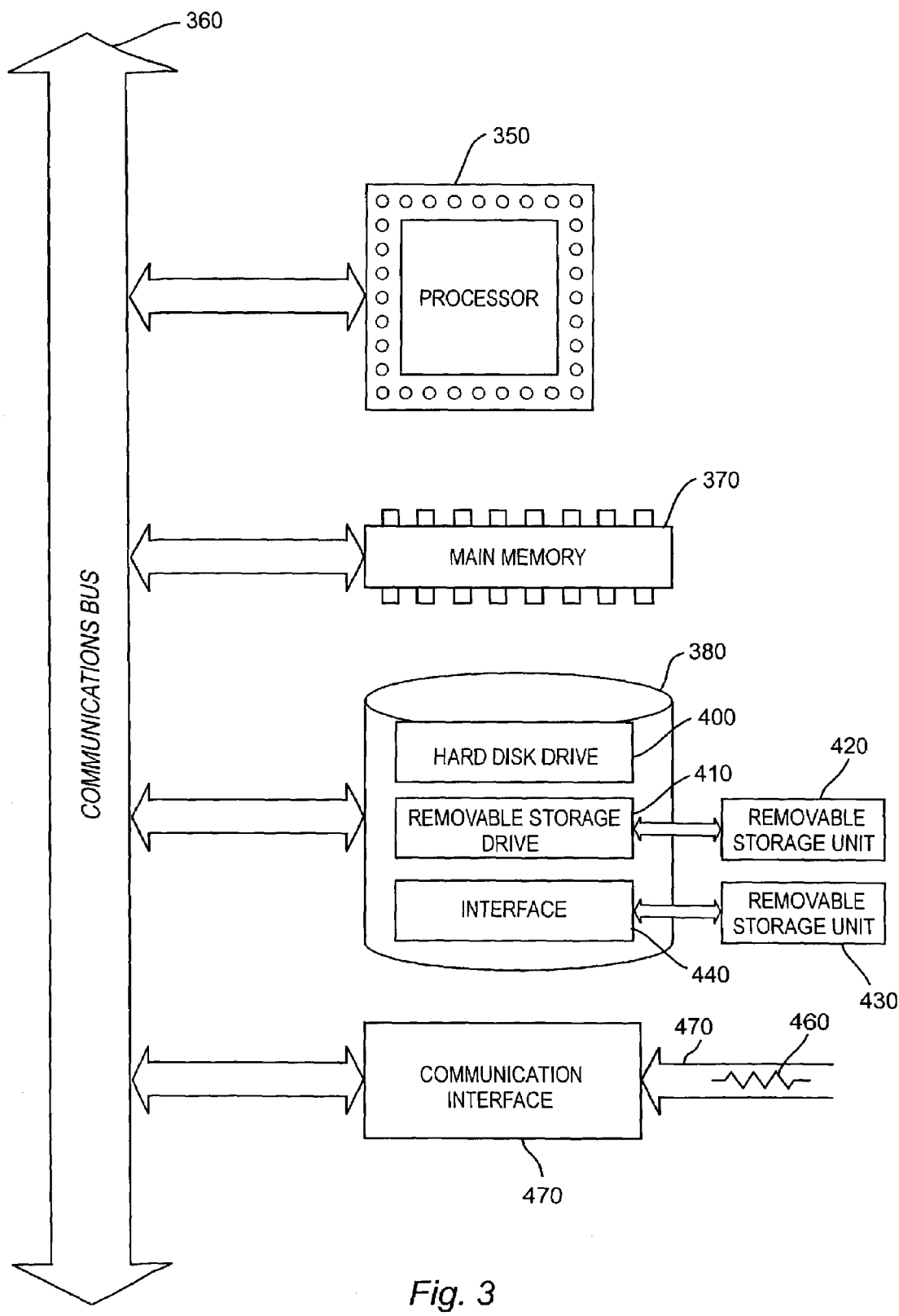
FIG. 3 is a schematic illustration of an embodiment of a computer used with the embodiment of a self-checkout system as illustrated in FIGS. 1 and 2.

FIG. 3 illustrates various components of the computer 260 or a computer system that may be used to control the self-checkout system 100. The computer system may include one or more processors 350 with a conventional input/output device. The processor 350 preferably has processing characteristics dependent upon, for example, the processing overhead and the type of processing that is typical for that processor. Generally, a processor may be implemented using any type of processor or processors that may perform mathematical calculation, data comparison, signal input and output, or other processing as described herein. Thus, as used throughout, the term "processor" refers to a wide variety of computational devices or means including, for example, using multiple processors that perform different processing tasks or have the same tasks distributed between processors. The processor(s) may be general purpose CPUs or special purpose processors such as are often conventionally used in digital signal processing systems. Alternatively, some or all of the processing may also be implemented with hard-wired circuitry such as an application-specific integrated circuit (ASIC), a field programmable gate array (FGPA) or other logic device.

Moreover, the computer system may include a main memory 370 or a secondary memory 380, or both, that may communicate with the processor 350 through a communication bus 360. The main memory 370 is preferably a random access memory (RAM) that may include an item buffer for temporarily holding identification information corresponding to scanned items before the items are verified by the self-checkout system 100. On the other hand, the secondary memory 380 with standard input/output ports may include any storage medium such as a hard disk drive 400, a removable storage drive 410 (such as a floppy disk drive, a magnetic tape drive, an optical disk drive, or flash memory), or removable storage units 420, 430 and interface 440 (such as EPROM or PROM removable memory chips, flash memory cards, PCMCIA cards, or program cartridges and cartridge interfaces similar to those found in video game devices). Alternatively, the secondary memory 380 may include handheld computing devices such as personal digital assistants, for example, the PalmPilot or Handspring Visor devices. More importantly, the secondary memory 380 may include one or more databases such as a look-up database that includes SKU value, price, item codes, tolerance range for the item or for a class of items, and corresponding weight, height, length, or width for each item (hereinafter "security characteristic") in the grocery store. This database on the secondary memory 380 may reside on different or additional computers such as an attendant's terminal at an attendant station, a central store server, or a remote server outside of the store.

It is contemplated that the computer system need not include a main memory 370. In this situation, the processor 350 may communicate with the secondary memory 380, which may be a remote server, for example, accessed via local area network or global network such as the Internet, and refresh a display screen with information and software stored in the remote server. Indeed, as distributed computing technologies continue to mature, and bandwidth continues to increase, it is contemplated that computers not using memory may be more desirable in the interest of cost and size constraints.

Communications between the processor 350 and the main memory 370 or the secondary memory 380 may be facilitated by communications bus 360 which may include electronic, electromagnetic, wireless, infrared, fiber optics, RF, or other suitable communications links. Likewise, the communication between the computer 260 and the external devices described in conjunction with FIGS. 1 and 2 may be facilitated by communication interface 450 that allows software and data to be transferred between the computer 260 and external devices. Examples of these communications interfaces 450 include direct link such as USB, IE1334, a modem, a network interface (such as an Ethernet card), a communications port, PCMCIA slot and card. Other examples include wireless link such as infrared port, analog or digital cellular interfaces, or any other suitable communication links. The signals 460 going back and forth between the computer and the external devices may be in the form of electronic, electromagnetic, optical, infrared signals, etc.

EXAMPLE I

This example illustrates the use of the self-checkout systems as described above. After selecting all the items she desires to buy, a customer brings the items to one of the self-checkout systems 100. A touch-screen LCD or CRT display 140 provides the customer with instructions and allows her to communicate with the system. The system will instruct the customer to scan the items she wishes to purchase. Each item in the store bears an identification code or an item code such as Universal Product Codes (UPC), industrial symbols, alphanumeric characters, or other information associated with the item. Preferably, the customer scans multiple items sequentially with the identification-code reader 120, but she can also scan and verify one item at a time. A preferred reader 120 is the Magellan® laser scanner available from PSC Inc. of Eugene Oreg. The Magellan® scanner has horizontal and vertical scan windows for scanning items from multiple directions. If valid code patterns are present, the system 100 preferably beeps and the scanned items' identification information, such as the SKU value or item code, may be determined and temporarily stored in the item buffer. As the items are being scanned, the system 100 may retrieve the price information of the item(s) from an appropriate database or report the item information to a store controller software program (e.g., IBM SA system), which can calculate the subtotals for the items. The price of each item and a running subtotal may also be displayed to the customer through the LCD or CRT display 140.

After the identification-code reader 120 has identified a predetermined number of items, one or more of the items are placed inside a grocery bag on top of the security-bagging scale 290 and weighed. The predetermined number of items may be one or a finite number up to a limit set by an operator within configuration parameters of the device. This weighing process verifies that the items actually being removed from the store are the same items as those being read or scanned into the reader 120 and paid for by the customer. To verify, the system 100 retrieves from the look-up database the security-weight information for the item(s). It then compares the value of the security weight to the value of the measured weight(s) of the item(s) on the security-bagging scale 290. The measured weight is the difference between the weight before and after the items were placed on the scale. If the measured weight matches within a tolerance range of the security-weight information from the database for each item or the sum of the security weight for all of the items identified and currently stored in the item buffer 390, then the system approves the transaction and acknowledges approval with an audible beep or other sign.

For example, if the predetermined number of items for scanning is two, a customer may scan a first item and a second item, one with each hand, and then place either or both of the items inside the bag on the security-bagging scale 290. Afterwards, the computer 260 using computer software may compare the weight measured on the scale 290 and the security-weight information retrieved for the first scanned item, the second scanned item, or the sum of the security weights of the first and second items. The customer may continue to scan third and fourth items, and set them on the security-bagging scale 290, which already holds the first and second items. The weight for the third and fourth items may be determined by the difference between the total weight of the four items together and the weight of the first and second items, as previously determined. The computer 260 compares the weights and determines if this difference in weight matches with the security-weight information retrieved for the third item scanned, the fourth item scanned, or the sum of security weights of the third and fourth items. This process continues until the customer has scanned and placed all items on the scale. Hence the customer can quickly scan multiple items with the computer continuously verifying the weight of the scanned items. By the time scanning of all the items have been completed, the items may also have been bagged and ready to be carried away by the customer as soon as the customer makes payment.

The customer may also scan, weigh, and verify one item at a time or in any other combinations. For example, the customer may scan an item number 1 and scan an item number 2, but initially only weight-verify item number 2. The customer may then continue to scan an item number 3 and weight-verify both item numbers 1 and 3. The customer may then scan an item number 4 and weight-verify item number 4.

In addition to or as an alternative, the customer may also present the item or items to an item-shape sensor before weighing of the items. The item-shape sensor may measure the physical characteristics of the item in terms of height, width, or length, and sends the signal to the computer. The computer may then compare, similar to the process for weight, the stored security height, length, or width of the item to the measured characteristics and determine if there is a match. Other measurable characteristics may also be used to verify security; these characteristics may include volume, reflectivity, or color of the item.

Using a matching algorithm, the computer program may perform the matching by first receiving a signal ("measured-characteristic signal") from the weight scale, the item-shape sensor, or any other measuring device that measures physical characteristics of an item. The measured-characteristic signal corresponding to the weight, height, length, width, or any other physical characteristics of the item may then be compared to the stored characteristic, whose signal is retrieved from the database. As used in this description, "match" or "matches" may mean "equal" or "equals." But "match" or "matches" may also be used to indicate that the values compared are within a certain tolerance range of one another. For example, to match, the measured weight must fall within a weight-tolerance range defined by the security weight plus or minus a tolerance value (TOL). TOL is a value in unit of mass that may be associated with an item in the store. Each item, preferably, has a different TOL value set by the operator. Different TOL value may also be associated with different classes of items in the store. The weight tolerance range may be increased or decreased by multiplying TOL with a global-tolerance variable (GTV) representing a number that correlates to a desired level of security. GTV may be any number, but preferably close to 1.0. The more expensive the item, for example, the lower is the TOL value to increase security. Accordingly, depending upon the level of security desired for the item, a store personnel or manager may assign a lower or higher TOL to the item. Furthermore, a store personnel or manager may increase or decrease the overall store security by adjusting the global-tolerance variable (GTV). This global-tolerance variable proportionately affects the tolerance of all items in the store.

For example, a bag of candy may be assigned at TOL value 0.01 unit of mass, while a can of beans may be assigned a TOL value of 0.1 unit of mass. Assuming the global-tolerance variable is initially set at 1, the store personnel may decrease the overall store security level during peak hours by increasing the global-tolerance variable to 2. The bag of candy will then have an adjusted tolerance range of 0.02 unit of mass and the can of beans will have an adjusted tolerance range of 0.2 unit of mass. Thus, the system now verifies a match if the difference between the measured weight of the bag of candy and the security weight for the bag of candy falls within ±0.02 unit of mass. Likewise, the system will verify a match for the beans if the difference is within plus or minus 0.2 unit of mass. More transactions will thus be approved and the throughput for the self-checkout system is increased. During the night when there are fewer customers, the store personnel or manager may increase the security by decreasing the global tolerance variable. Accordingly, a balance between security and throughput may be struck in that during peak hours, decreased security may lead to less rejection by the system and less intervention by the store manager or attendant. Less intervention in turn may lead to greater customer satisfaction in using the system. But because the customer does not know that the system's tolerance ranges have been changed, the customer may maintain a perception that the security control is the same throughout the day. This perception, in turn, may deter some attempts to steal from the store. Hence this particular embodiment of a self-checkout system includes a tolerance range that can be modified by an operator at the store and that may be different for different classes of items, or on an item-by-item basis. An operator as used herein is defined as a store employee such as a clerk, attendant, or manager who oversees the self-checkout activity.

When the store attendant or manager desires to modify the global tolerance variable, he or she may modify the variable through a number of different ways. The global tolerance variable may be modified through a user-interface such as the touch screen LCD or CRT display 140 located at the self-checkout counter or located at an attendant station. The attendant station may also have a computer system that controls and monitors multiple checkout counters. Hence, a store attendant or manager may modify the global tolerance variable remotely using the user-interface input at the attendant station affecting multiple self-checkout counters.

The global tolerance variable may also be modified through the identification-code reader. Using the identification-code reader, the system may be presented with a range of codes that represents the desired security. If these codes are scanned, the system recognizes the code and reprograms the global tolerance variable. This programming method is disclosed in U.S. Pat. No. 4,861,972, which is hereby incorporated by reference as if fully set forth herein. Programming by this method may modify the global tolerance variable for the particular self-checkout counter having the identification-code reader, but may also be used to modify multiple self-checkout counters that may be linked together through a network.

If the security verification is unsuccessful (i.e., the measured characteristic does not match the security characteristic), the system may instruct the customer to take the item(s) out of the bags, rescan and reweigh the item(s). If after a number of unsuccessful verifications, the system notifies a store attendant through an alarm or notifier. Examples of the alarm or notifier may include a flashing light, an audible sound, a message on a remote computer or terminal at an attendant station or other remote computer, a vibrating pager, or other suitable notifier. Being alerted of the unsuccessful verification, the store attendant may physically approach the particular self-checkout counter or may simply monitor the particular transaction through the surveillance video camera 250.

The attendant may instruct the customer to put the scanned item on a separate weight scale 130, which is preferably integrated with the reader 120. The system would require the attendant to verify that the item on the scale 130 is the item scanned by the customer. If the attendant so verifies, the new measured weight may be accepted into the look-up database, and the attendant may ask the customer to put the item on the security-bagging scale 290.

Through this process, the security weight of the item may be updated. If the item is one that is new in the store's inventory, this process creates a record for the new item. If the item is an old item with a security weight that is not current, this process allows the attendant to substitute the previous security weight with the new measured weight or an average between the new measured weight and the previous security weight. Alternatively, the new measured weight or the average between the new measured weight and the previous security weight may be added to the database and used for future transactions.

On the other hand, instead of requiring the customer to go through the re-weigh activity described above, the attendant may also override the security scale violation by touching an "override" portion of the LCD or CRT display 140 so that the customer does not have to remove and weigh the item(s). If this override method is used, data from the security-bagging scale 290 are preferably not accepted as weight input into the look-up database.

After the system has verified the weights as described above, the customer may apply coupons by scanning them with the identification-code reader 120 and the price total may then be adjusted accordingly. The customer may then pay either with cash via the bill acceptor 160, with a credit card, a cash or debit card, or through an electronic benefits transfer via the Electronic Funds Transfer ("EFT")/magnetic strip card reader 210; or with a check (manual or semi-automatic) via the check reader/writer (MICR) 220. If cash is tendered, the system 100 may dispense change via the bill dispenser 180 and coin dispenser 170. The customer may also pay with voucher, coupons, or WIC. For payment with check, voucher, coupons, or credit cards, for example, a store attendant may be required to take possession of certain transaction instruments, such as the check, voucher, coupon, or a signed credit card receipt. Finally, the receipt printer 200 may print out a receipt, and the self-checkout transaction is completed.

For added security, some of all of the items being checked out may also include a magnetic tag, radio frequency identification tag, electronic tag or other tag to prevent someone from removing items from the store without properly checking the items out. If an item is properly scanned, the electronic-article-surveillance deactivator 230 may be actuated, causing a deactivating coil to be energized and the tag on the item to be deactivated or removed. If an item was not properly scanned, the tag remains active on the item and the electronic-article-surveillance monitor 300 senses the tag. The customer may then be prompted to re-scan the item. If scanning is successful, the tag is deactivated or removed.

EXAMPLE II

Using an updating algorithm, the security information of an item stored in the database may be automatically updated by the computer software. The updating function may be applied to the security weight, height, width, length or any other characteristics of the item. Using the security weight as an example, each item's weight information stored in the database may be updated through repeated weight measurements of that particular kind of item, i.e. items with the same item code. A database having a plurality of data records may be created for temporarily storing each weight measurements for that item every time the item is scanned and weighed. After reaching a specified number of measurements, the computer algorithm may calculate a mean or average weight, or any other statistically determined characteristic of the population of the item, from the recorded weight measurements in the database. The mean weight or any other statistically determined characteristic may be assigned as the new security weight of the item or rewritten over the old security weight of the item. The computer may also calculate a new tolerance value TOL based upon the variance of the repeated measurements.

Measuring, recalculating, and re-writing the security weight and/or the TOL value of a particular item over time and/or based upon the amount of variance noted allows the system to update itself and account for variability of the item's weight from lot to lot. For example, the computer software may have an algorithm that calculates a rolling mean weight for a can of beans based on scanning ten different cans of beans over a period of time. The rolling mean weight may be set as the new security weight in the database. When a can of beans is scanned for the eleventh time, the algorithm may drop the first data point from the calculation and only determine the mean from the second time a can of beans was scanned to the eleventh time, and so on. Hence, an item's security weight may be updated to account for subtle shifts in weight for a can of beans. Again the store attendant or manager may set and modify the number of data points that the computer software takes into account using an identification-code reader or a user-interface at the self-checkout counter or at the attendant station as described in Example I.

In addition, this updating process may be used to enter weight information for an item that is new to the store inventory. The first time that the system scans an item, it may signal a weight violation, which as described in Example I, a store attendant may request the customer to reweigh the item on the weight scale 130 and a new weight information is stored for the new item. Alternatively, the self-checkout system may recognize the item as new in that the item code does not have a corresponding record in the database. The system using the computer program may then create a record for the new item and record the measured weight in the database (as the security weight for the item) and characteristics related to tolerance. The system may then allow the transaction to go through. As this new item is subsequently scanned, the software algorithm may calculate the mean weight after a specified number of measurements or calculate the rolling mean weight, and replace the calculated mean as the security weight for the item in the database. Hence security-weight information for a new item is created and updated according to the above process. Accordingly, less intervention may be needed from the store attendant or manager, which improves throughput and ultimately leads to greater customer satisfaction.

EXAMPLE III

Figure 4:
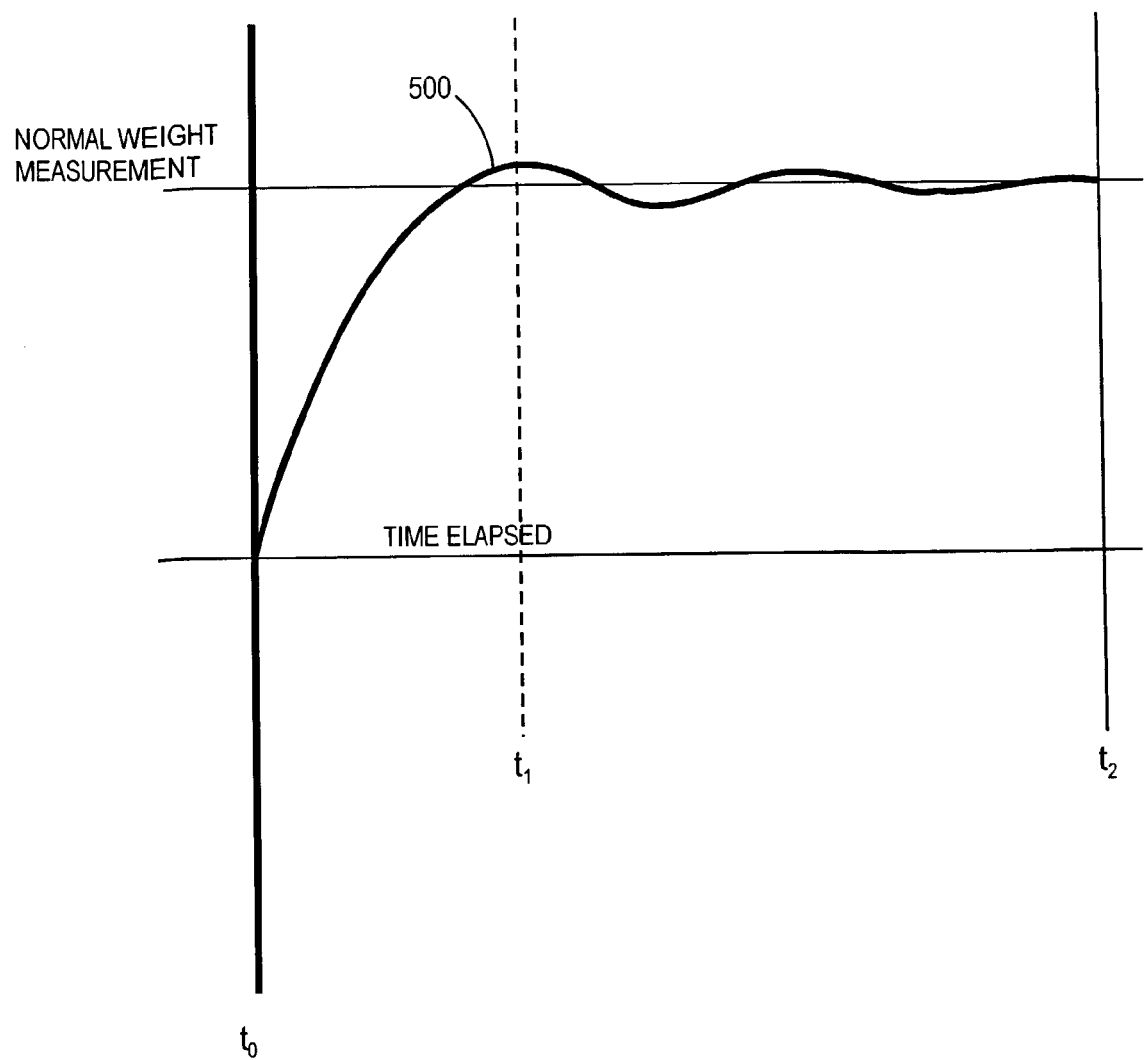
FIG. 4 depicts a sample response curve of an electronic weighing scale used with the embodiment of a self-checkout system as illustrated in FIGS. 1 and 2.

Generally, scales require a period of time to settle so that they may provide an accurate weight measurement. Some electronic scales, accordingly, will not report an in-transit weight, i.e., a weight measurement of the load on the scale before the scale has settled. FIG. 4 is a representative curve showing weight measurements over time for a typical scale with a $t_2$ settling period. In this example, the use of a dynamic weight scale with the self-checkout system is described.

A dynamic weight scale is an electronic scale that continuously reports weight measurements of the load or item placed on the scale. Examples of this type of scale include any mechanical scale or electronic scale for which internal circuitry or data processing to mask in-motion weights has not been implemented. In this embodiment of the invention, a response characteristic of a dynamic weight is first determined allowing a prediction of the time the scale reading would be within a given percentage of the final or actual weight value of the load. The weight value reported to the system and used for security verification may then be sampled at this pre-determined time. In this manner, throughput will be increased because the item may be verified in less than the time it would take to receive an actual weight measurement of the item from the scale. Again, the store attendant or manager can modify the pre-determined time depending on circumstances by using an identification-code reader or a user-interface at the self-checkout counter or at the attendant station similar to the methods described in Example I.

In other words, the computer 260 may be programmed to accept a weight measurement from the dynamic weight scale at certain fixed times before the scale settles. If, for example, a manager wishes a lower level of security to increase throughput, the acceptance time for the computer may be set to a shorter time. At this time, the computer accepts and compares the reported weight to the stored weight of the item and determines if there is a match. It may be required to increase the weight tolerance range of the store items to accommodate for the premature measurements.

In another example, a minimum time may be set in which the computer will not accept the reported weight before the set minimum time. Hence, before the set minimum time, no security verification may be performed. With reference to FIG. 4, the minimum time may be set, for example, at the time the measured weight hits the first peak 500 at $t_1$. This minimum time ensures that a different item weighing 20 oz., for example, does not falsely trigger approval when the scale reports 9 oz. before the minimum time. Since each item will have a different peak time, the minimum time may be determined for each item, stored in a database, and retrieved according to the item code scanned with the identification-code reader.

In a preferred embodiment, the present Example IV may be incorporated with the weight-tolerance range described in Example I, i.e., the system will accepts a match if the reported measured weight is within a tolerance range of the security weight for a class of items or for a specific item.

EXAMPLE V

Figure 5:
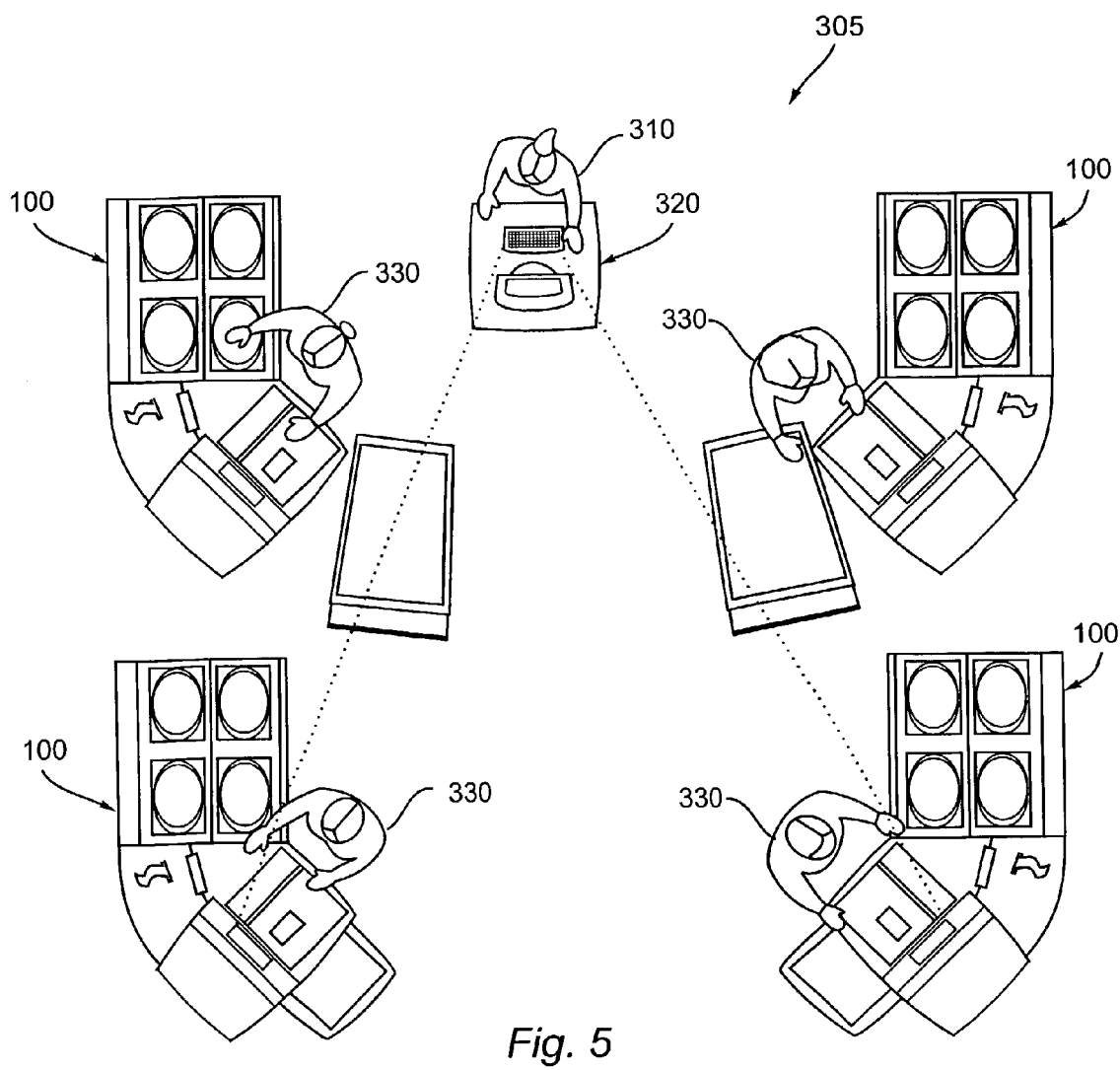
FIG. 5 is a top plan view of multiple self-checkout systems in an exemplary retail environment.

This example illustrates how multiple self-checkout counters may be arranged in a store. With reference to FIG. 5, the self-checkout system 100 may be one of multiple self-checkout systems 100 in a retail or commercial establishment 305 such as a grocery store. An attendant 310 is normally stationed at an attendant station 320. The attendant station 320 may be positioned at a focal point in relation to multiple self-checkout counters as shown in FIG. 5 such that the attendant 310 can oversee the self-checkout activities of the customers 330 at one or more self-checkout systems 100. The attendant station 320 may include an attendant terminal or computer, a monitor 324, and one or more input and output devices. In a preferred embodiment, one attendant station 320 oversees four self-checkout systems 100. Depending on the particular store or circumstance, however, this ratio may be greater or smaller.

A method and system for self-checkout of items have been described. It is contemplated that a customer using the described self-checkout system may experience enhanced customer satisfaction due to increased throughput and speed of the checkout process. The method also requires less operator intervention and offers greater flexibility to the store manager or attendant in balancing security and throughput but may elicit shopper's perception of increased control.

Although the present invention has been described above in the context of certain preferred embodiments, one skilled in the art would understand that various modifications may be made to those embodiments and various equivalents may be substituted without departing from the spirit or scope of the invention. In addition, the above examples are provided for illustration purposes only and are not intended to limit the invention.

We claim:

1. A method of checking out items having item codes comprising:
    associating a first group of items with a first metric corresponding to a physical characteristic common to every item in the first group;
    assigning a first tolerance value to the first metric;
    determining a first tolerance range for the first tolerance value;
    associating a second group of items with a second metric corresponding to a physical characteristic common to every item in the second group;
    assigning a second tolerance value to the second metric;
    determining a second tolerance range for the second tolerance value; and
    applying a global tolerance variable to the first and second tolerance values.

2. The method in claim 1 wherein applying a global tolerance variable to the tolerance values changes the first tolerance range disproportionately with respect to a stored security characteristic associated with the first group of items relative to the change in the second tolerance range with respect to a stored security characteristic associated with the second group of items.

3. The method in claim 1 wherein the first tolerance value is a number representing a unit of measurement.

4. The method in claim 3 wherein the unit of measurement is a unit of mass.

5. The method in claim 1 wherein the physical characteristic of the items in the first group is selected from a group consisting of a weight, length, width, depth and height of the item.

6. The method in claim 1 further comprising the steps of:
creating a record for a new item after the new item has been scanned for a first time;
storing a measured physical characteristic of the new item as a stored security characteristic of the new item;
calculating a statistically determined value from a plurality of measurements of the physical characteristic for items having the same item code as the new item; and
replacing the stored security characteristic of the new item with the calculated statistically determined value.

7. The method of claim 6 further comprising calculating a value representing a tolerance value for the new item based on the plurality of measurements for items having the same item code as the new item.

8. The method of claim 6 wherein the statistically determined value is an average of the plurality of measurements.

9. The method in claim 1 further comprising:
measuring a weight of an item using a weighing scale;
reporting the weight of the item before the weighing scale settles;
retrieving a stored security weight of the item and a tolerance range associated with a tolerance value for the item;
comparing the reported weight of the item with the stored security weight of the item;
accepting the identity of the item if the reported weight is within the tolerance range;
changing the tolerance range of the item by applying a global variable to the tolerance value with which the tolerance range is associated; and
setting a time at which the reported weight is compared with the stored security weight, said time being before the weighting scale settles and said time is modifiable by an operator.

10. The method of claim 1 further comprising:
associating each of the items of the first group with a common identification code;
measuring a physical characteristic of an item identified as belonging to the first group of items;
comparing the measure of the item identified as belonging to the first group with the first tolerance range;
accepting the item as identified if the measure is within the first tolerance range;
associating each of the items of the second group with a common identification code;
measuring a physical characteristic of an item identified as belonging to the second group of items;
comparing the measure of the item identified as belonging to the second group with the second tolerance range; and
accepting the item as identified if the measure is within the second tolerance range.

11. The method of claim 10 further comprising:
changing the global tolerance variable; and
applying the global tolerance variable to the first and second tolerance values to change the first and second tolerance ranges disproportionately relative to the respective metric with which each is associated.

* * * * *